(12) United States Patent
Chen

(10) Patent No.: US 11,846,254 B2
(45) Date of Patent: Dec. 19, 2023

(54) INTEGRATED PROPULSION SYSTEM FOR HYBRID ROCKETS

(71) Applicant: AT SPACE PTY LTD, North Adelaide (AU)

(72) Inventor: Yen-Sen Chen, North Adelaide (AU)

(73) Assignee: AT SPACE PTY LTD, North Adelaide (AU)

( * ) Notice: Subject to any disclaimer, the term of this patent is extended or adjusted under 35 U.S.C. 154(b) by 0 days.

(21) Appl. No.: 18/117,403

(22) Filed: Mar. 4, 2023

(65) Prior Publication Data

US 2023/0204004 A1    Jun. 29, 2023

Related U.S. Application Data

(63) Continuation-in-part of application No. 17/343,739, filed on Jun. 10, 2021.

(51) Int. Cl.

| | |
|---|---|
| *F02K 9/60* | (2006.01) |
| *F02K 9/97* | (2006.01) |
| *F02K 9/72* | (2006.01) |
| *F02K 9/50* | (2006.01) |
| *F02K 9/64* | (2006.01) |
| *F02K 9/58* | (2006.01) |
| *F02K 9/80* | (2006.01) |

(52) U.S. Cl.
CPC .............. *F02K 9/605* (2013.01); *F02K 9/50* (2013.01); *F02K 9/58* (2013.01); *F02K 9/64* (2013.01); *F02K 9/72* (2013.01); *F02K 9/80* (2013.01); *F02K 9/972* (2013.01)

(58) Field of Classification Search
CPC ... B64G 1/402; F02K 9/50; F02K 9/58; F02K 9/60; F02K 9/605; F02K 9/64; F02K 9/80; F02K 9/82; F02K 9/972
See application file for complete search history.

(56) References Cited

U.S. PATENT DOCUMENTS

| | | | | |
|---|---|---|---|---|
| 3,230,704 A | * | 1/1966 | Lovingham | F02K 9/64 60/260 |
| 3,669,320 A | * | 6/1972 | Purcell, Jr. | F02K 9/50 222/389 |
| 5,961,074 A | * | 10/1999 | Dunn | B64G 1/402 244/135 R |
| 6,745,983 B2 | * | 6/2004 | Taylor | F02K 9/60 244/171.1 |
| 2003/0093987 A1 | * | 5/2003 | Taylor | F02K 9/605 60/257 |
| 2009/0235636 A1 | * | 9/2009 | Oehrlein | F02K 9/64 60/200.1 |

* cited by examiner

*Primary Examiner* — Kyle Robert Thomas
(74) *Attorney, Agent, or Firm* — BRUCE STONE LLP; Joseph A. Bruce

(57) ABSTRACT

An integrated propulsion system for hybrid rockets includes an oxidizer tank, a rocket engine, a pressurization device, a pressurization device and an oxidizer pipe and valve unit. The rocket engine is disposed within the oxidizer tank partially and located on a first side of the oxidizer tank. The pressurization device is disposed, at least in part, within the oxidizer tank, is located on a second side of the oxidizer tank opposite to the first side of the oxidizer tank, and is configured to regulate an overall pressure level within the oxidizer tank. The oxidizer pipe and valve unit is connected to the oxidizer tank and the rocket engine, and is configured to control feeding of an oxidizer from the oxidizer tank into the rocket engine.

10 Claims, 2 Drawing Sheets

INTEGRATED PROPULSION SYSTEM FOR HYBRID ROCKETS

CROSS REFERENCE TO RELATED APPLICATIONS

This application is a continuation-in-part of U.S. patent application Ser. No. 17/343,739 filed on Jun. 10, 2021. The above application is incorporated by reference herein.

BACKGROUND

Field of the Invention

The present invention relates to a rocket propulsion system, and more particularly to an integrated propulsion system for hybrid rockets.

Description of Related Art

Conventional hybrid rocket propulsion systems consist of an oxidizer tank holding liquid or gaseous oxidizer, an oxidizer mass flow pipe and valve system, and a solid fuel motor consisting of an injector, a combustion chamber holding segments of solid fuel, and a convergent-divergent nozzle commonly made of heat resistant composite materials. Typically, the solid fuel motor is disposed outside the oxidizer tank. Although it is simple for the technical personnel in the art to externally assemble the solid fuel motor to the oxidizer tank, such a hybrid rocket propulsion system's overall structural mass fraction is usually not optimized for better rocket performance, and the composite nozzle is limited in system burn time length due to higher nozzle regression rates compared to traditional solid rocket nozzles.

SUMMARY

One objective of the present invention is to provide an integrated propulsion system for hybrid rockets that loses its weight as far as possible while achieving better rocket performance.

Another objective of the present invention is to provide an integrated propulsion system for hybrid rockets that possibly prevents the nozzle of the rocket engine from nozzle erosion.

Yet another objective of the present invention is to provide an integrated propulsion system for hybrid rockets that possibly lengthens the system burn time thereof.

To achieve one or more of the forementioned objectives, the present invention provides an integrated propulsion system of a hybrid rocket according to an embodiment, which includes an oxidizer tank, a rocket engine, a pressurization device and an oxidizer pipe and valve unit. The oxidizer tank includes a first tank casing for containing an oxidizer. The rocket engine is located on a first side of the oxidizer tank and includes an oxidizer injector, a combustion chamber and a nozzle. The oxidizer injector and the combustion chamber are arranged inside the first tank casing of the oxidizer tank, and the combustion chamber is located between and connected to the oxidizer injector and the nozzle. The pressurization device is located on a second side of the oxidizer tank opposite to the first side of the oxidizer tank, and includes a pressurization tank which is arranged inside the first tank casing of the oxidizer tank, and a pressurization control valve that is connected to the pressurization tank and mounted on the first tank casing of the oxidizer tank. The pressurization device is configured to regulate an overall pressure level within the oxidizer tank. The oxidizer pipe and valve unit is arranged outside the first tank casing, is connected to the first tank casing and the rocket engine, and is configured to control and feed of the oxidizer contained in the oxidizer tank, into the rocket engine.

Optionally, the oxidizer injector and the combustion chamber are located between the pressurization device and the oxidizer pipe and valve unit, the oxidizer injector is located between the pressurization tank and the combustion chamber, and the pressurization tank, the pressurization control valve, the oxidizer injector and the combustion chamber are aligned along a geometric central axis of the integrated propulsion system.

Optionally, the oxidizer tank includes a first tank casing, the rocket engine includes an engine casing having an average thickness thinner than an average thickness of the first tank casing.

Optionally, the pressurization tank includes a second tank casing having an average thickness that is thinner than an average thickness of the first tank casing.

Optionally, the integrated propulsion system further includes a cooling device connected to the rocket engine and the oxidizer pipe and valve unit and is configured to thermally protect the rocket engine, and the cooling device includes a coolant chamber, the coolant chamber surrounds the rocket engine, is communicated with a feeding channel of the oxidizer pipe and valve unit and is communicated with the combustion chamber of the rocket engine through the oxidizer injector, so that the oxidizer flows from the oxidizer tank to the coolant chamber through the feeding channel of the oxidizer pipe and valve unit, and then flows from the coolant chamber to the combustion chamber through the oxidizer injector.

Optionally, the oxidizer pipe and valve unit includes an oxidizer feeding pipe and an oxidizer filling control valve, the oxidizer feeding pipe includes the feeding channel that connects the oxidizer tank to the cooling device for the feeding of the oxidizer, and the oxidizer filling control valve is connected to the oxidizer feeding pipe and configured to selectively enable and adjust the feeding of the oxidizer in the oxidizer feeding pipe toward the combustion chamber.

Optionally, the oxidizer pipe and valve unit further includes at least one liquid injection thrust vector control (LITVC) valve connected to the oxidizer feeding pipe and configured to selectively enable and adjust the feeding of the oxidizer in the oxidizer feeding pipe toward the nozzle.

Optionally, the cooling device separates the oxidizer injector from the oxidizer contained in the first tank casing.

Optionally, the cooling device and the oxidizer contained in the first tank casing separate the pressurization tank from the rocket engine.

Optionally, the nozzle includes a convergent section and an outlet section, the convergent section is located between and connected to the combustion chamber and the outlet section, the coolant chamber extends from the outlet section to the convergent section, and the oxidizer pipe and valve unit is connected to the cooling device at a portion of the outlet section far from the convergent section, so that the oxidizer fed by the oxidizer pipe and valve unit flows past the nozzle to cool the nozzle while flowing through the coolant chamber.

Optionally, the oxidizer tank is made of a filament wound carbon fiber composite material.

BRIEF DESCRIPTION OF THE DRAWINGS

After studying the detailed description in conjunction with the following drawings, other aspects and advantages of the present invention will be discovered.

DETAILED DESCRIPTION

Figure 1:
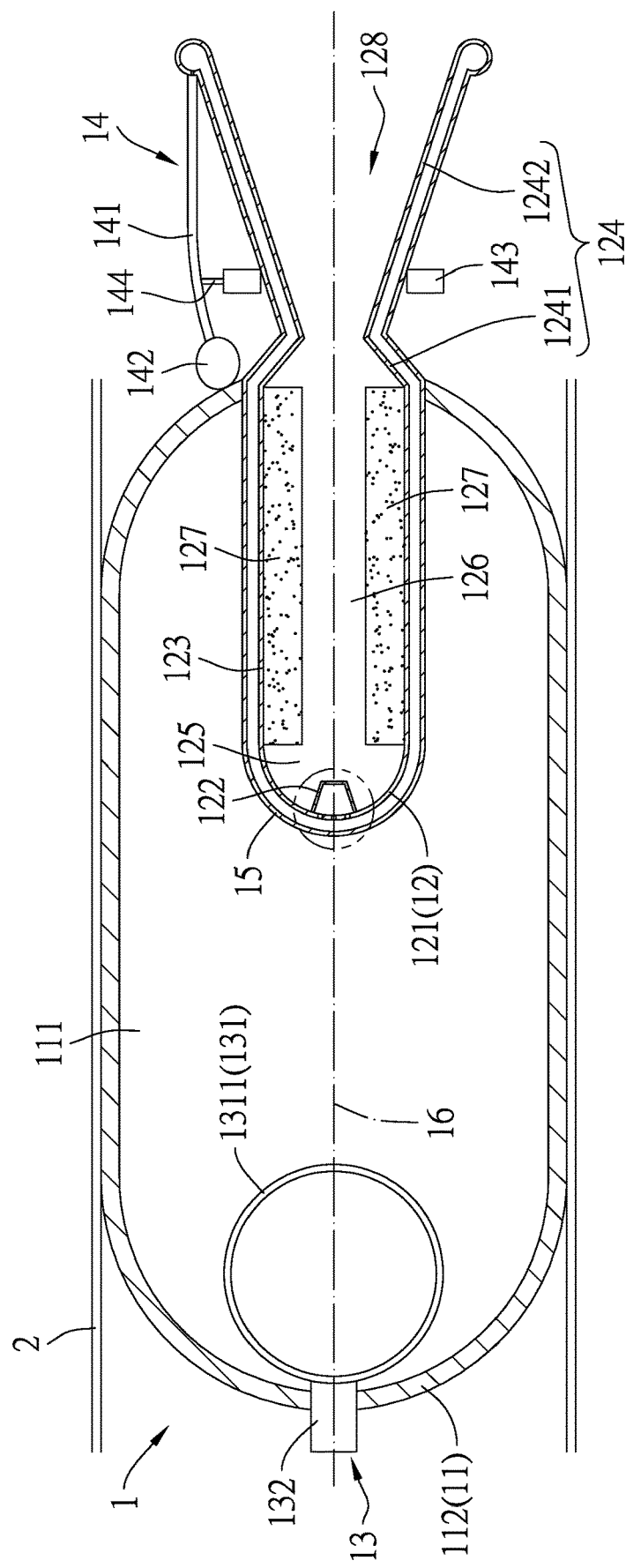
FIG. 1 is a schematic diagram of an integrated propulsion system installed in a hybrid rocket according to an embodiment of the present invention.
Figure 2:
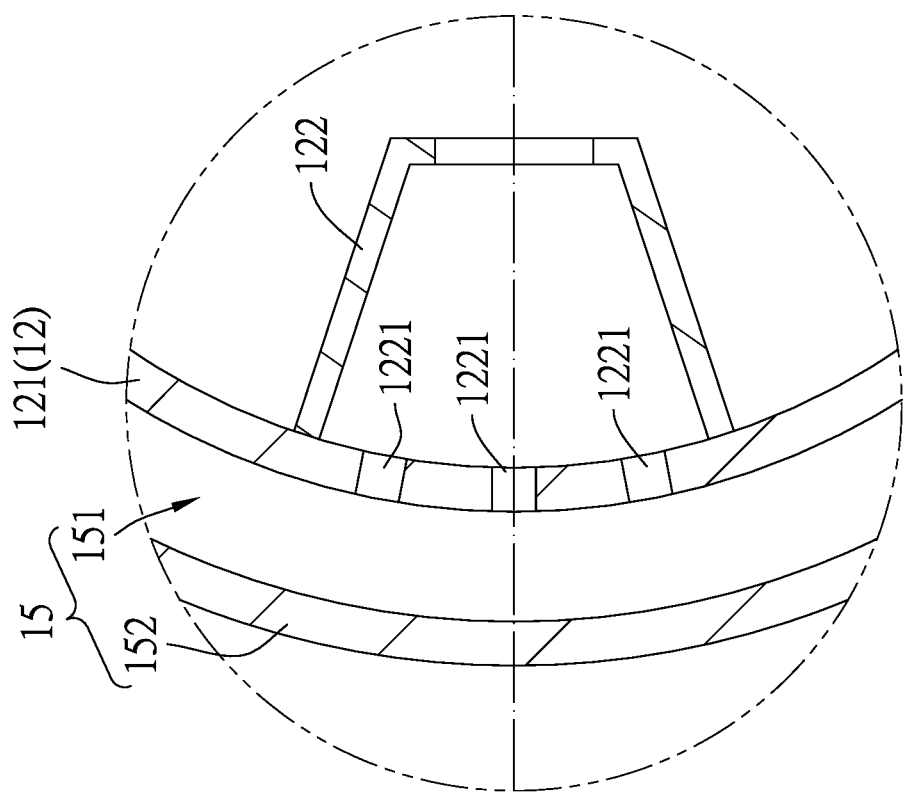
FIG. 2 is an enlarged view of a part of the propulsion system in FIG. 1 according to an embodiment of the present invention.

Please refer to FIGS. 1 and 2 showing an integrated propulsion system 1 provided according to an embodiment of the present invention. The propulsion system 1 is suitable for being installed in an inner space of a hybrid rocket so that a rocket casing 2 of the hybrid rocket can protect the propulsion system 1. The propulsion system 1 mainly includes an oxidizer tank 11, a rocket engine 12, a pressurization device 13, an oxidizer pipe and valve unit 14 and a cooling device 15.

The oxidizer tank 11 is made of a filament wound carbon fiber composite material. The oxidizer tank 11 has an inner space 111 for being filled with a liquid or gaseous oxidizer and accommodating at least a part of the rocket engine 12, at least a part of the pressurization device 13, and at least a part of the cooling device 15. The rocket engine 12 and the pressurization device 13 are located on the two opposite sides (i.e., the first and second sides) of the oxidizer tank 11.

The rocket engine 12 includes an engine casing 121, an oxidizer injector 122 in an injection zone thereof, a combustion chamber 123 in a chamber zone thereof, and a nozzle 124 in a nozzle zone thereof. The combustion chamber 123 is positioned between the oxidizer injector 122 and the nozzle 124. Specifically, the first end of the oxidizer injector 122 is far from the combustion chamber 123, the second end of the oxidizer injector 122 opposite to the first end of the oxidizer injector 122 is connected to the first end of the combustion chamber 123, the second end of the combustion chamber 123 opposite to the first end of the combustion chamber 123 is connected to the first end of the nozzle 124, the second end of the nozzle 124 is opposite to the first end of the nozzle 124.

In the embodiment, the oxidizer injector 122, the combustion chamber 123 and the nozzle 124 are located in the inner space 125 of the engine casing 121; and the output space 128 of the nozzle 124 is communicated with the inner space 125. Moreover, the oxidizer injector 122 and the combustion chamber 123 are located inside the oxidizer tank 11, and the convergent section 1241 (i.e., the first end) and the outlet section 1242 (i.e., the second end) of the nozzle 124 is located outside the oxidizer tank 11. The oxidizer injector 122 and the combustion chamber 123 are aligned along the geometric central axis 16 of the propulsion system 1.

The main portion of the combustion chamber 123 is formed as a cylindrical tube, in which one or more combustion channels 126 and a solid fuel 127 surrounding the one or more combustion channels 126 are disposed. The respective combustion channel 126 extending along the geometric central axis 16 of the propulsion system 1 is used for the flowing of the oxidizer. The solid fuel 127 is close to or attached to the inner surface of the engine casing 121 in the chamber zone and is used for reacting with the oxidizer passing through the combustion channel 126.

The pressurization device 13 is closer to the first end of the oxidizer injector 122 but far from the combustion chamber 123 and the nozzle 124, and includes a pressurization tank 131 and a pressurization control valve 132. The pressurization tank 131 is mounted to the first tank casing 112 of the oxidizer tank 11, is located in the inner space 111 of the oxidizer tank 11, and is spaced from the rocket engine 12. The pressurization tank 131 and the pressurization control valve 132 are also aligned along the geometric central axis 16 of the propulsion system 1. The pressurization control valve 132 is mounted to the first tank casing 112 of the oxidizer tank 11 and has a part located outside the oxidizer tank 11. The pressurization control valve 132 is connected to the pressurization tank 131 so that the pressurization control valve 132 is capable of operatively regulating an overall pressure level within the oxidizer tank 11 by filling gas into the pressurization tank 131 or draining gas from the pressurization tank 131.

The cooling device 15 is, for example, a regenerative cooling mechanism, is disposed (connected) to the rocket engine 12 by covering on the oxidizer injector 122, the combustion chamber 123 and the nozzle 124. Specifically, as shown in FIGS. 1 and 2, the cooling device 15 includes a coolant chamber 151 and a wall 152 surrounding the engine casing 121 of the rocket engine 12. The wall 152 and the high-pressure oxidizer contained in the first tank casing 112 separate the engine casing 121 from the second tank casing 1311 of the pressurization tank 131.

The wall 152 of the cooling device 15 and the engine casing 121 of the rocket engine 12 form together the coolant chamber 151 therebetween, and the coolant chamber 151 covers a part or all of the outer surface of the engine casing 121 of the rocket engine 12, so that the coolant chamber 151 extends along the oxidizer injector 122, the combustion chamber 123 and the nozzle 124. The coolant chamber 151 is communicated with the combustion chamber 123 of the rocket engine 12 through the through holes 1221 of the oxidizer injector 122.

The oxidizer pipe and valve unit 14 includes an oxidizer feeding pipe 141, an oxidizer filling control valve 142 and one or more LITVC valves 143. The oxidizer feeding pipe 141 is connected to the oxidizer tank 11, the feeding channel of the oxidizer feeding pipe 141 is communicated with the inner space 111 of the oxidizer tank 11 operationally, and the oxidizer filling control valve 142 is disposed on the oxidizer feeding pipe 141, whereby the oxidizer filling control valve 142 can control the enabling or disabling of the feeding channel of the oxidizer feeding pipe 141 to control the communication between the inner space 111 of the oxidizer tank 11 and the feeding channel of the oxidizer feeding pipe 141 for the adjustably flowing of high-pressure oxidizer from the oxidizer tank 11 to the oxidizer feeding pipe 141.

The oxidizer feeding pipe 141 is also connected to the cooling device 15. The feeding channel of the oxidizer feeding pipe 141 is communicated to the coolant chamber 151 of the cooling device 15 at the portion of the outlet section 1242 of the nozzle 124 far from the convergent section 1241. In this way, the coolant chamber 151 can serve as a coolant channel for sending the high-pressure oxidizer in the feeding channel of the oxidizer feeding pipe 141, to the combustion chamber 123 through the oxidizer injector 122, and for thermally protecting the rocket engine 12.

The oxidizer feeding pipe 141 is also connected to the rocket engine 12. The respective LITVC valve 143 is disposed on an individual branch 144 of the oxidizer feeding pipe 141 such that the LITVC valve 143 controls the enabling or disabling of this branch 144 for the adjustably flowing of the high-pressure oxidizer in the feeding channel of the oxidizer feeding pipe 141, to the output space 128 of the nozzle 124.

Through the foregoing structure, the oxidizer contained in the oxidizer tank 11 is allowable to flow to the combustion chamber 123 through the feeding channel and the coolant chamber 151 when the oxidizer filling control valve 142 enables the feeding channel of the oxidizer feeding pipe 141. Since the coolant chamber 151 spreads on the outer surface of the rocket engine 12, the outer surface of the rocket engine 12 within the oxidizer tank 11 and the outer surface of the rocket engine 12 outside the oxidizer tank 11 both are possibly cooled through the high-pressure oxidizer outputted from the oxidizer tank 11 and flowing in the coolant chamber 151. The cooling device 15 possibly protects the rocket engine 12 from thermal damage. In particular, the coolant chamber 151 of the cooling device 15 extends from the outlet section 1242 of the nozzle 124 to the convergent section 1241 of the nozzle 124 so that the oxidizer fed by the oxidizer pipe and valve unit 14 and flowing within the coolant chamber 151 can flow past the outlet section 1242 of the nozzle 124 to the convergent section 1241 of the nozzle 124 to efficiently cool the nozzle 124 and protect the nozzle 124 from nozzle erosion, thereby possibly reducing the nozzle regression rate. Further, the oxidizer contained in the oxidizer tank 11 is also allowable to flow to the output space 128 of the nozzle 124 through the branch when the LITVC valve 143 enables the branch, thereby lengthening the system burn time.

On the other hand, since the rocket engine 12 is located within and protected by the oxidizer tank 11, it is possible for the engine casing 121 of the rocket engine 12 to be thinned. For example, the engine casing 121 of the rocket engine 12 within the oxidizer tank 11 has an average thickness thinner than the average thickness of the first tank casing 112 of the oxidizer tank 11. Likewise, it is also possible the second tank casing 1311 of the pressurization tank 131 to be thinned. For example, the second tank casing 1311 of the pressurization tank 131 has an average thickness thinner than the average thickness of the first tank casing 112. In this way, the propulsion system 1 would become lighter for a higher propellant mass fraction of a rocket stage, leading to better rocket performance.

While we have shown and described various embodiments in accordance with the present invention, it is clear to those skilled in the art that further embodiments may be made without departing from the scope of the present invention.

What is claimed is:

1. An integrated propulsion system of a hybrid rocket, comprising:
   an oxidizer tank comprising a first tank casing for containing an oxidizer;
   a rocket engine, located on a first side of the oxidizer tank, and comprising an oxidizer injector, a combustion chamber and a nozzle, the oxidizer injector and the combustion chamber being arranged inside the first tank casing of the oxidizer tank, and the combustion chamber being located between and connected to the oxidizer injector and the nozzle;
   a pressurization device, located on a second side of the oxidizer tank opposite to the first side of the oxidizer tank, and comprising a pressurization tank which is arranged inside the first tank casing of the oxidizer tank, and a pressurization control valve that is connected to the pressurization tank and mounted on the first tank casing of the oxidizer tank, and the pressurization device configured to regulate an overall pressure level within the oxidizer tank; and
   an oxidizer pipe and valve unit, arranged outside the first tank casing, connected to the first tank casing and the rocket engine, and configured to control and feed the oxidizer contained in the oxidizer tank, into the rocket engine,
   wherein the oxidizer injector and the combustion chamber are located between the pressurization device and the oxidizer pipe and valve unit, the oxidizer injector is located between the pressurization tank and the combustion chamber, and the pressurization tank, the pressurization control valve, the oxidizer injector and the combustion chamber are aligned along a geometric central axis of the integrated propulsion system.

2. The integrated propulsion system according to claim 1, wherein the rocket engine comprises an engine casing having an average thickness thinner than an average thickness of the first tank casing.

3. The integrated propulsion system according to claim 1, wherein the pressurization tank comprises a second tank casing having an average thickness that is thinner than an average thickness of the first tank casing.

4. The integrated propulsion system according to claim 1, further comprising a cooling device connected to the rocket engine and the oxidizer pipe and valve unit and configured to thermally protect the rocket engine, and the cooling device comprises a coolant chamber, the coolant chamber surrounds the rocket engine, is communicated with a feeding channel of the oxidizer pipe and valve unit and is communicated with the combustion chamber of the rocket engine through the oxidizer injector, so that the oxidizer flows from the oxidizer tank to the coolant chamber through the feeding channel of the oxidizer pipe and valve unit, and then flows from the coolant chamber to the combustion chamber through the oxidizer injector.

5. The integrated propulsion system according to claim 4, wherein the oxidizer pipe and valve unit comprises an oxidizer feeding pipe and an oxidizer filling control valve, the oxidizer feeding pipe comprises the feeding channel connecting the oxidizer tank to the cooling device for the feeding of the oxidizer, and the oxidizer filling control valve is connected to the oxidizer feeding pipe and configured to selectively enable and adjust the feeding of the oxidizer in the oxidizer feeding pipe toward the coolant chamber.

6. The integrated propulsion system according to claim 5, wherein the oxidizer pipe and valve unit further comprises at least one liquid injection thrust vector control (LITVC) valve connected to the oxidizer feeding pipe and configured to selectively enable and adjust the feeding of the oxidizer in the oxidizer feeding pipe toward the nozzle.

7. The integrated propulsion system according to claim 4, wherein the cooling device separates the oxidizer injector from the oxidizer contained in the first tank casing.

8. The integrated propulsion system according to claim 4, wherein the cooling device and the oxidizer contained in the first tank casing separate the pressurization tank from the rocket engine.

9. The integrated propulsion system according to claim 4, wherein the nozzle comprises a convergent section and an outlet section, the convergent section is located between and connected to the combustion chamber and the outlet section, the coolant chamber extends from the outlet section to the convergent section, and the oxidizer pipe and valve unit is connected to the cooling device at a portion of the outlet section far from the convergent section, so that the oxidizer fed by the oxidizer pipe and valve unit flows past the nozzle to cool the nozzle while flowing through the coolant chamber.

10. The integrated propulsion system according to claim 1, wherein the oxidizer tank is made of a filament wound carbon fiber composite material.

* * * * *